(12) United States Patent
Nakahama

(10) Patent No.: US 10,635,081 B2
(45) Date of Patent: Apr. 28, 2020

(54) TOOL STATE ESTIMATION APPARATUS AND MACHINE TOOL

(71) Applicant: FANUC CORPORATION, Yamanashi (JP)

(72) Inventor: Yasuhiro Nakahama, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 140 days.

(21) Appl. No.: 15/902,560

(22) Filed: Feb. 22, 2018

(65) Prior Publication Data

US 2018/0246494 A1 Aug. 30, 2018

(30) Foreign Application Priority Data

Feb. 24, 2017 (JP) .................. 2017-033896

(51) Int. Cl.

| | |
|---|---|
| *G05B 19/4065* | (2006.01) |
| *G06N 20/00* | (2019.01) |
| *G06F 15/76* | (2006.01) |
| *G06N 3/04* | (2006.01) |
| *G06N 3/08* | (2006.01) |

(Continued)

(52) U.S. Cl.
CPC ....... *G05B 19/4065* (2013.01); *G05B 19/182* (2013.01); *G05B 19/4083* (2013.01); *G06F 15/76* (2013.01); *G06N 3/02* (2013.01); *G06N 3/0454* (2013.01); *G06N 3/084* (2013.01); *G06N 20/00* (2019.01); *G05B 2219/37252* (2013.01)

(58) Field of Classification Search
CPC .............. G05B 19/4065; G05B 19/182; G05B 19/4083; G05B 2219/37252; G06N 20/00; G06N 3/02

See application file for complete search history.

(56) References Cited

U.S. PATENT DOCUMENTS

| | | |
|---|---|---|
| 4,011,792 A | 3/1977 | Davis |
| 4,471,444 A | 9/1984 | Yee et al. |

(Continued)

FOREIGN PATENT DOCUMENTS

| | | |
|---|---|---|
| CN | 103105820 A | 5/2013 |
| JP | S57-79431 A | 5/1982 |

(Continued)

OTHER PUBLICATIONS

Dutta, R. K., et al. "Assessment of machining features for tool condition monitoring in face milling using an artificial neural network." Proceedings of the Institution of Mechanical Engineers, Part B: Journal of Engineering Manufacture 214.7 (2000): 535-546. (Year: 2000).*

(Continued)

*Primary Examiner* — Eric Nilsson
(74) *Attorney, Agent, or Firm* — Hauptman Ham, LLP

(57) ABSTRACT

A scattering direction, a scattering range, a scattering speed, or the like of chip generated by machining is acquired by image pickup unit, and a state (such as wearing and fracture) of a tool is estimated from the acquired dynamic information. A machine learning device is used to perform the estimation and the machine learning device is caused to learn a state of a tool relative to the combination of a plurality of dynamic information on the vicinity of the tool, and the state of the tool is estimated based on a result of the learning.

10 Claims, 9 Drawing Sheets

(51) Int. Cl.
*G05B 19/18* (2006.01)
*G05B 19/408* (2006.01)
*G06N 3/02* (2006.01)

(56) References Cited

U.S. PATENT DOCUMENTS

| | | | |
|---|---|---|---|
| 5,251,144 A | * | 10/1993 | Ramamurthi ...... G05B 19/4065 700/177 |
| 9,849,554 B2 | * | 12/2017 | Sodemann ......... B23Q 17/2452 |
| 2010/0067998 A1 | | 3/2010 | Miyamoto et al. |
| 2017/0032283 A1 | | 2/2017 | Kamiya |
| 2017/0364056 A1 | | 12/2017 | Ono et al. |
| 2018/0181105 A1 | | 6/2018 | Shindou |

FOREIGN PATENT DOCUMENTS

| JP | S60-263651 A | 12/1985 |
|---|---|---|
| JP | H2-131840 A | 5/1990 |
| JP | H3-49850 A | 3/1991 |
| JP | H11170102 A | 6/1999 |
| JP | H11-267949 A | 10/1999 |
| JP | 2000-107984 A | 4/2000 |
| JP | 2002224925 A | 8/2002 |
| JP | 2006-95656 A | 4/2006 |
| JP | 2008-87092 A | 4/2008 |
| JP | 2011045988 A | 3/2011 |
| JP | 2017-33239 A | 2/2017 |
| JP | 2017-227947 A | 12/2017 |
| JP | 2018-103284 A | 7/2018 |

OTHER PUBLICATIONS

Office Action in JP Application No. 2017-033896, dated Jan. 29, 2019, 6pp.
Office Action in JP Application No. 2017-033896, dated Jul. 31, 2018, 7pp.
Office Action in JP Application No. 2017-033896, dated Nov. 20, 2018, 7pp.
Office Action in corresponding Chinese Application No. 201810155465. 2; dated Oct. 21, 2019; 12 pgs.

* cited by examiner

FIG. 1
(I)
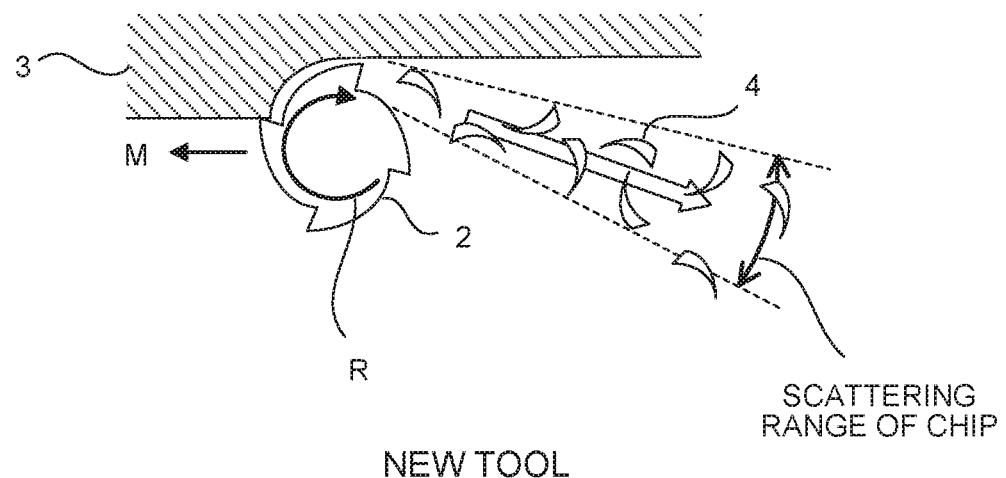
NEW TOOL
(II)
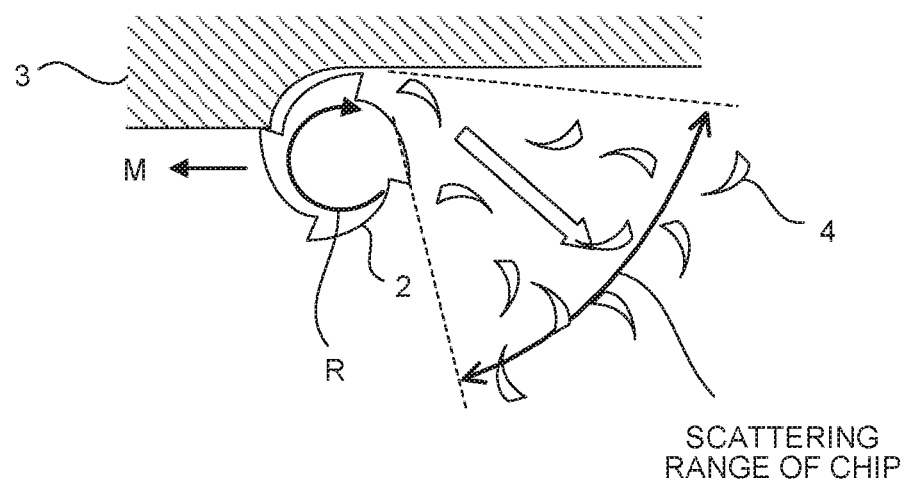
WORN-OUT TOOL

INPUT DATA = ( $V_c$, $l_c$, $\theta_c$, $C_c$ )

TOOL STATE ESTIMATION APPARATUS AND MACHINE TOOL

RELATED APPLICATIONS

The present application claims priority of Japanese Application Number 2017-033896, filed Feb. 24, 2017, the disclosure of which is hereby incorporated by reference herein in its entirety.

BACKGROUND OF THE INVENTION

1. Field of the Invention

The present invention relates to a tool state estimation apparatus that estimates a state of a tool used in a machine tool and the machine tool.

2. Description of the Related Art

Generally, the machining accuracy of a tool used in a machine tool is deteriorated when the tool wears out at its blade tip and increases its cutting resistance with the lapse of machining time, and thus the tool may not maintain its prescribed machining accuracy necessary for a workpiece. It is generally determined that the life span of the tool has expired at this point. Examples of a method for determining whether the life span of a tool has expired includes confirming a worn-out amount of the blade tip of the tool and determining whether the worn-out amount has exceeded a target worn-out range, other than directly confirming the machining accuracy of a workpiece. However, it is necessary to have the step of determining a life span separately from a machining operation, which becomes one of factors responsible for disturbing the efficiency of a machining cycle. Therefore, a technology for estimating a state of a tool in advance is important for an improvement in machining yield.

As a related art for determining a state of a tool, Japanese Patent Application Laid-open No. 2011-45988 discloses a technology by which an image of a cutting tool is picked up by an image pickup unit and a state of the tool is determined based on the data of the image. Further, as a related art relating to the estimation of a state of a tool, Taylor's tool life equation has been known (Japanese Patent Application Laid-open No. 11-170102 or the like). When a state of a tool is estimated by the Taylor's tool life equation, a constant is set based on machining conditions such as a tool used in machining and a workpiece material and the set constant is applied to the Taylor's tool life equation. Thus, a state of a tool may be estimated under various machining conditions. Further, a technology for estimating a state of a tool based on a machining time, a machining frequency, or the like has also been proposed (Japanese Patent Application Laid-open No. 2002-224925 or the like).

However, when a worn-out state of a tool is directly confirmed, it is necessary to measure the tool by a measurement device or the like after a machining time, which results in an increase in a machining cycle time.

Further, when the life span of a tool is estimated by the Taylor's tool life equation, it is necessary to calculate a constant of the equation according to machining conditions. Therefore, since the determination of a constant becomes complicated in a machine tool of which the machining conditions often change, it is difficult to estimate the life span of a tool by the Taylor's tool life equation.

Further, when the life span of a tool is estimated based on a machining time, a machining frequency, or the like, it is necessary to record a machining time and a machining frequency for each tool in advance and its estimation method depends on an empirical rule based on actual machining. Therefore, the estimation of a state of a tool becomes difficult as a matter of course in a situation in which machining conditions often change. As a result, a tool of which the life span has not expired is discarded, or a defective product is massively produced due to the continuous use of a tool even if the life span of the tool has expired.

SUMMARY OF THE INVENTION

In view of the above problems, it is an object of the present invention to provide a tool state estimation apparatus and a machine tool capable of estimating a state of a tool with high accuracy without increasing a machining cycle time.

In the present invention, dynamic information (such as a scattering direction, a scattering range, and a scattering speed of chip generated by machining) around a tool during machining is acquired by an image pickup unit and a state (such as wearing and fracture) of the tool is estimated from the acquired dynamic information on the vicinity of the tool to solve the above problems. In the present invention, a machine learning device is used to estimate a state of a tool and caused to learn the state of the tool with respect to the combination of a plurality of dynamic information on the vicinity of the tool, and the state of the tool is estimated based on a result of the machine learning.

In a first embodiment of a tool state estimation apparatus according to the present invention, a state of a tool used by a machine tool to machine a workpiece is estimated. The tool state estimation apparatus includes: a state observation section that acquires dynamic information on the vicinity of the tool from log data acquired during an operation of the machine tool and generates input data based on the acquired dynamic information on the vicinity of the tool; a learning section that performs machine learning using the input data generated by the state observation section to construct a learning model; and a learning model storage section that stores the constructed learning model.

The tool state estimation apparatus may further include: a label acquisition section that acquires, from the log data acquired during the operation of the machine tool, the teacher data indicating the state of the tool corresponding to the input data generated by the state observation section. The learning section may be configured to perform supervised learning using the input data generated by the state observation section and the teacher data acquired by the label acquisition section to construct a learning model.

The learning section may be configured to perform unsupervised learning using the input data generated by the state observation section to construct a learning model in which a cluster based on the dynamic information on the vicinity of the tool is generated.

In a second embodiment of a tool state estimation apparatus according to the present invention, a service life of a tool used by a machine tool to machine a workpiece is estimated. The tool state estimation apparatus includes: a learning model storage section that stores a learning model constructed by machine learning based on dynamic information on the vicinity of the tool acquired during an operation of the machine tool; a state observation section that acquires dynamic information on the vicinity of the tool from log data acquired during the operation of the machine tool and generates input data based on the acquired dynamic information on the vicinity of the tool; and an estimation section that estimates a state of the tool from the input data generated by the state observation section using the learning model.

The dynamic information on the vicinity of the tool may be information on an image indicating a scattering state of chip generated by machining of the machine tool.

A machine tool according to the present invention includes an alert section that issues an alert based on an estimation result of the state of the tool by the tool state estimation apparatus according to the second embodiment of the tool state estimation apparatus.

According to the present invention, it is not necessary to stop a machining operation since it becomes possible to estimate a state of a tool based on dynamic information on the vicinity of the tool acquired by an image pickup unit in machining. Therefore, it is possible to estimate a state of a tool without increasing a cycle time. Further, since a state of a tool is estimated according to a result of machine learning based on dynamic information on the vicinity of the tool, it becomes possible to estimate a state of a tool with high accuracy corresponding to various situations.

BRIEF DESCRIPTION OF THE DRAWINGS

FIG. 1 is a diagram for describing a scattering state of chip when a workpiece is machined by an endmill tool;

DETAILED DESCRIPTION OF THE PREFERRED EMBODIMENTS

Figure 2:
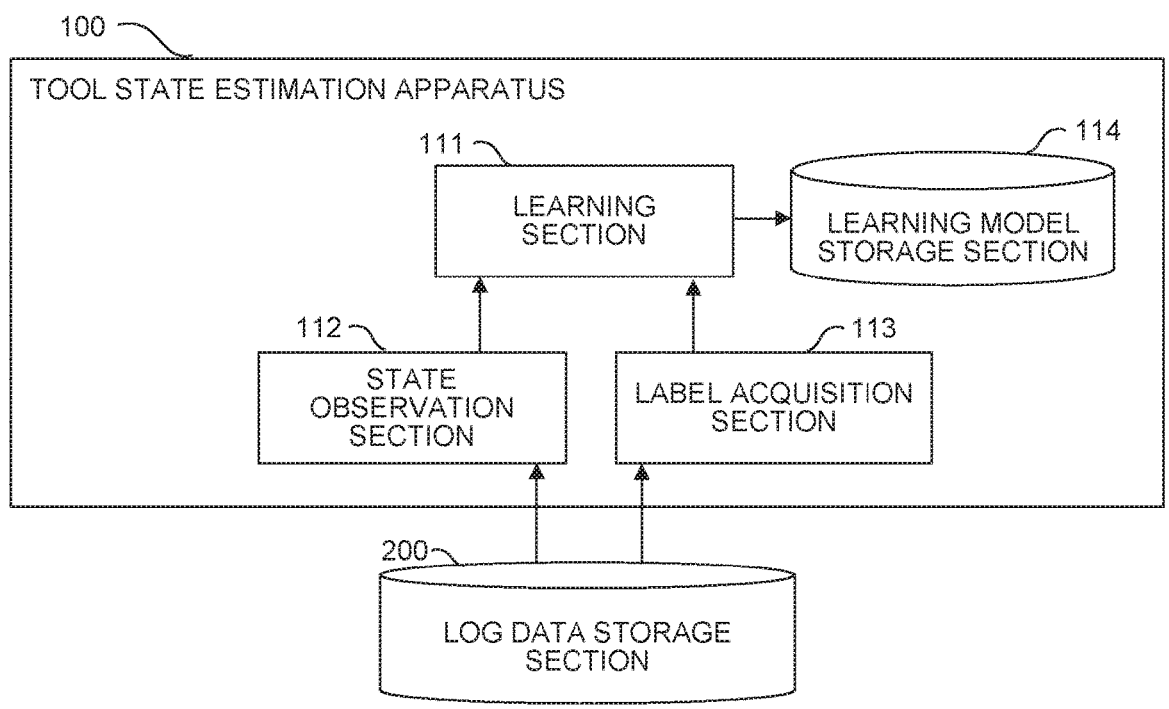
FIG. 2 is a schematic function block diagram of a tool state estimation apparatus in machine learning according to an embodiment of the present invention.

Hereinafter, a description will be given of embodiments of the present invention with reference to the drawings. First, a description will be given, with reference to FIG. 1, of a method for estimating a state of a tool with a tool state estimation apparatus of the present invention.

FIG. 1 is a diagram for describing a scattering state of chip 4 when a workpiece 3 is machined by an endmill tool 2.

The chip 4 generated when the side surface of the workpiece 3 is cut and machined by the endmill tool 2 scatters inside a machining region in association with the rotation of the tool 2. Here, when the workpiece 3 is machined by a new endmill tool 2, the chip 4 tends to scatter in a relatively narrow range in a direction completely opposite to a traveling direction M of the tool 2 as shown in the FIG. 1(I). On the other hand, when the workpiece 3 is machined by a worn-out endmill tool 2, the chip 4 scatters in a relatively wide range as shown in FIG. 1(II) and a scattering speed and a scattering distance of the chip 4 also change. Further, when a workpiece 3 made of carbon steel is machined by a new tool 2, yellow chip 4 is generated. On the other hand, when the workpiece 3 is machined by a worn-out tool, deep blue chip 4 is generated.

Based on the above findings that a state of chip (such as a scattering state and a color of the chip) in the machining of a workpiece changes according to a state of a tool, the inventor of the present invention has proposed a tool state estimation apparatus that acquires dynamic information (such as a scattering direction, a scattering range, a scattering speed, and a color of chip generated by machining) around a tool by an image pickup unit and estimates a state (such as wearing and fracture) of the tool from the acquired dynamic information on the vicinity of the tool.

The tool state estimation apparatus of the present invention uses a machine learning device to estimate a state of a tool from dynamic information on the vicinity of the tool. The machine learning device provided in the tool state estimation apparatus of the present invention performs the machine learning of the relationship between a state of a tool and dynamic information on the vicinity of the tool such as image information (a still image and a moving image) around the tool collected by an image pickup unit such as a camera and information on sound picked up by a sound pickup unit such as a microphone and generated between the tool and a workpiece in machining. Then, using a result of the machine learning, the machine learning device estimates the state of the tool from the dynamic information on the vicinity of the tool.

The machine learning device provided in the tool state estimation apparatus of the present invention may use various learning methods such as supervised learning and unsupervised learning as a learning method for performing the machine learning of the relationship between dynamic information on the vicinity of a tool and a state of the tool.

Hereinafter, a description will be given, with reference to FIGS. 2 to 9, of an embodiment of the tool state estimation apparatus of the present invention in a case in which supervised learning is used as a learning method.

FIG. 2 is a schematic function block diagram of the tool state estimation apparatus in machine learning according to an embodiment of the present invention.

A tool state estimation apparatus 100 of the embodiment may be realized by a controller that controls a machine tool at the production facility of a manufacturing industry, a personal computer connected to the controller, a host computer that comprehensively manages the respective controllers, or the like. The tool state estimation apparatus 100 performs machine learning based on log data collected from one or more machine tools and stored in a log data storage section 200 at the production facility of a manufacturing industry having the one or more machine tools.

The log data storage section 200 stores, for each of machine tools, dynamic information on the vicinity of a tool acquired from a machine tool operating at a production facility and information on a state of a tool in the machine tool input by an operator, as log data associated with time information.

Examples of dynamic information on the vicinity of a tool may include image information (a still image and a moving image) around a tool collected by an image pickup unit such as a camera, information on sound picked up by a sound pickup unit such as a microphone and generated between a tool and a workpiece in machining, a type of a tool for machining, a material of a workpiece, a type of coolant, a federate of a tool, a spindle speed, a blade tip temperature, a cumulative cutting time/cumulative cutting distance for each tool, cutting resistance (amplifier current values of a feed axis and a spindle), or the like. Further, examples of information on a state of a tool in a machine tool input by an operator may include information on the replacement of a tool input by an operator operating a machine tool or a maintenance staff dealing with trouble in the machine tool via the machine operation panel of a controller that controls the machine tool, or the like.

The log data storage section 200 may store dynamic information on the vicinity of a tool collected from a plurality of machine tools as log data. Further, the log data storage section 200 may be constructed as a general database.

A machine tool from which log data is to be collected controls respective driving sections provided in the machine tool to machine a workpiece, acquires states of the respective driving sections, detection values of sensors, or the like based on image information acquired by an image pickup unit attached so as to be capable of picking up an image around a tool, sound information acquired by a sound pickup unit for picking up sound generated between the tool and the workpiece, and signals acquired by other respective sections to generate log data on dynamic information on the vicinity of the tool of the machine tool, and stores the generated log data in the non-volatile memory of the machine tool, a storage device acting as external equipment, or the like.

Log data is so generated that operating situations of respective driving sections, temperature detection values by sensors, or the like are understandable in chronological order. Further, log data includes various information (such as a tool replacement operation) input by an operator operating a machine tool or a maintenance staff dealing with trouble in the machine tool via a machine operation panel. Log data stored in the non-volatile memory or the like of a machine tool as described above is collected into the log data storage section 200 via a network or the like or via an external storage device or the like carried by an operator or the like operating the machine tool. The collection may be performed every time log data is generated or may be periodically performed with an appropriate interval.

Next, prior to the descriptions of respective configurations provided in the tool state estimation apparatus 100, a description will be given of the outline of machine learning performed by the tool state estimation apparatus 100.

Figure 3:
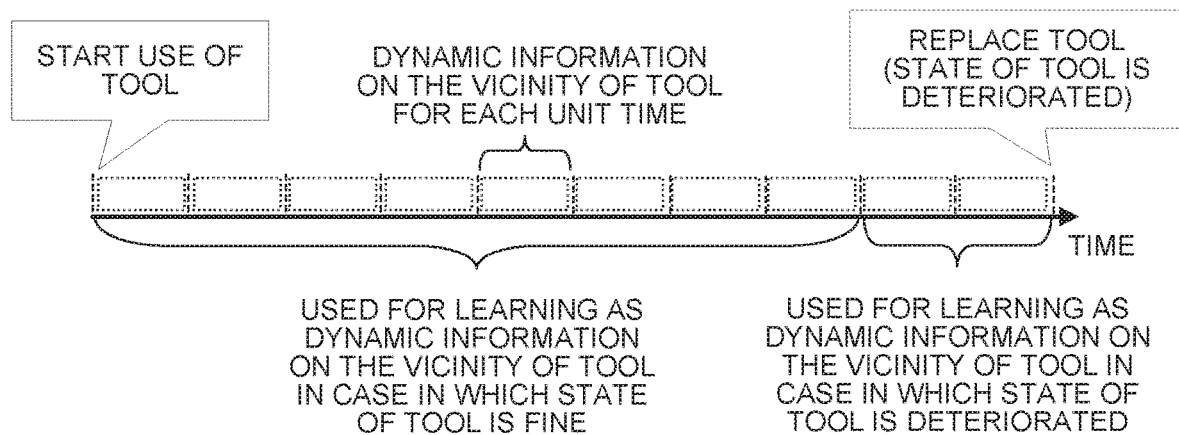
FIG. 3 is a diagram for describing a relationship between dynamic information on the vicinity of a tool and information on a state of the tool used in machine learning according to an embodiment of the present invention.

FIG. 3 is a diagram for describing dynamic information on the vicinity of a tool and information on a state of the tool used in machine learning according to an embodiment of the present invention. From log data stored in the log data storage section 200, the tool state estimation apparatus 100 of the embodiment collects dynamic information on the vicinity of a tool at a time at which a state of the tool is fine as "dynamic information on the vicinity of a tool in a case in which a state of the tool is fine", and collects dynamic information on the vicinity of the tool within a prescribed time (for example, one hour) before a time at which the tool is replaced as "dynamic information on the vicinity of a tool in a case in which a state of the tool is deteriorated". Based on the collected dynamic information on the vicinity of the tool, the tool state estimation apparatus 100 performs "supervised learning".

The "supervised learning" is a model by which sets of input and result (label) data are given to a machine learning device in large amounts to learn the features of the data sets and estimate results from inputs, i.e., a method by which the relationship between inputs and results may be inductively obtained. The method may be realized using an algorithm such as a neural network that will be described later. The tool state estimation apparatus 100 of the embodiment divides the dynamic information on the vicinity of a tool, recorded in the log data storage section 200, every unit time set in advance, and repeatedly performs the supervised learning with the divided unit as one input.

Figure 4:
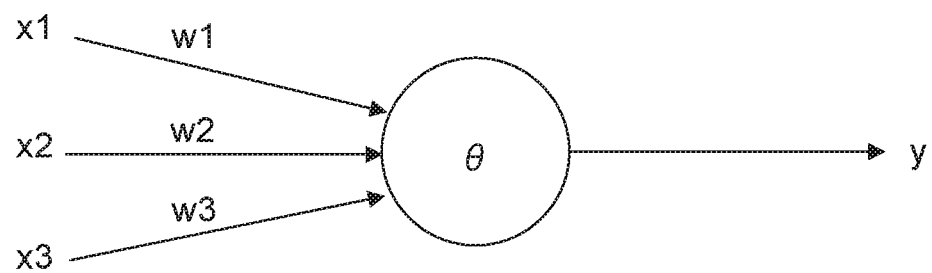
FIG. 4 is a schematic diagram showing a neuron model.

The neural network is constituted by a calculation unit, a memory, and the like that realize a neural network following a neuron model as shown in, for example, FIG. 4. FIG. 4 is a schematic diagram showing a neuron model.

As shown in FIG. 4, a neuron outputs an output y with respect to a plurality of inputs x (here, inputs $x_1$ to $x_3$ as an example). A corresponding weight w ($w_1$ to $w_3$) is placed on each of the inputs $x_1$ to $x_3$. Thus, the neuron outputs the output y expressed by the following formula (1). Note that in the following formula (1), an input x, an output y, and a weight w are all vectors. In addition, θ indicates a bias, and $f_k$ indicates an activation function.

$$y = f_k(\Sigma_{i=1}^{n} x_i w_i - \theta) \qquad (1)$$

Next, a description will be given, with reference to FIG. 5, of a neural network having weights of three layers in which the above neurons are combined together.

Figure 5:
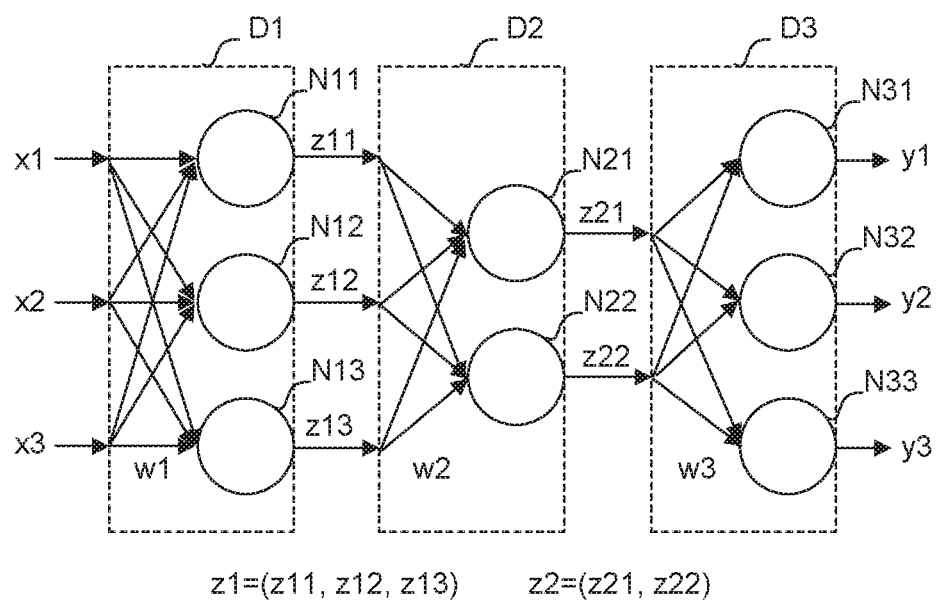
FIG. 5 is a schematic diagram showing a neural network having weights of three layers.

FIG. 5 is a schematic diagram showing a neural network having weights of three layers D1 to D3. As shown in FIG. 5, a plurality of inputs x (here, inputs x1 to x3 as an example) is input from the left side of the neural network, and results y (here, results y1 to y3 as an example) are output from the right side of the neural network.

Specifically, when inputs x1 to x3 are input to three neurons N11 to N13, corresponding weights are placed on the inputs x1 to x3. The weights placed on the inputs are collectively indicated as w1. The neurons N11 to N13 output z11 to z13, respectively. Z11 to Z13 are collectively indicated as a feature vector z1, and may be regarded as vectors obtained by extracting feature amounts of the input vectors. The feature vector z1 is a feature vector between the weight w1 and a weight w2.

When z11 to z13 are input to two neurons N21 and N22, corresponding weights are placed on these z11 to z13. The weights placed on the feature vectors are collectively indicated as w2. The neurons N21 and N22 output z21 and z22, respectively. z21 and z22 are collectively indicated as a feature vector z2. The feature vector z2 is a feature vector between the weight w2 and a weight w3.

When the feature vectors z21 and z22 are input to three neurons N31 to N33, corresponding weights are placed on these feature vectors z21 and z22. The weights placed on the feature vectors are collectively indicated as w3.

Finally, the neurons N31 to N33 output the results y1 to y3, respectively.

The operation of the neural network includes a learning mode and a value prediction mode. A learning data set is used to learn the weight w in the learning mode, and the parameters are used to determine the action of a machining machine in the prediction mode (here, "prediction" is only for the sake of convenience, but various tasks such as detection, classification, and deduction may be included).

It is possible to immediately learn data obtained by actually controlling a machine in the prediction mode and reflect the learning data on a next action (online learning), or is possible to perform collective learning using a previously-collected data group and thereafter perform a detection mode using the parameters at all times (batch learning). It is also possible to perform an intermediate mode, i.e., a learning mode that is performed every time data is accumulated by a certain degree.

Learning of the weights w1 to w3 is made possible by error back propagation. Error information enters from the right side and flows to the left side. The error back propagation is a method for adjusting (learning) each of the weights to reduce a difference between the output y obtained when the input x is input and a real output y (supervised) for each of the neurons.

Figure 6:
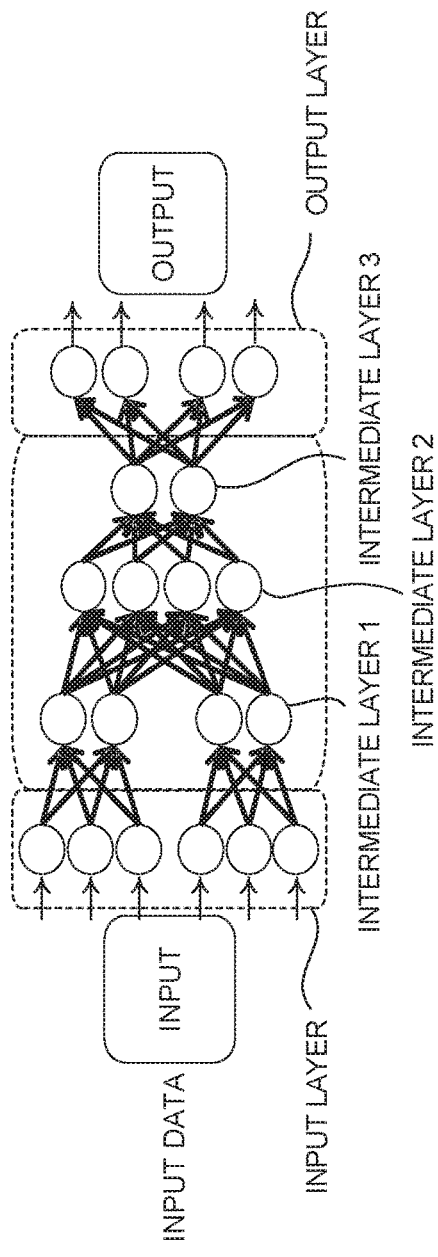
FIG. 6 is a schematic diagram showing a multilayer neural network.
Figure 7:
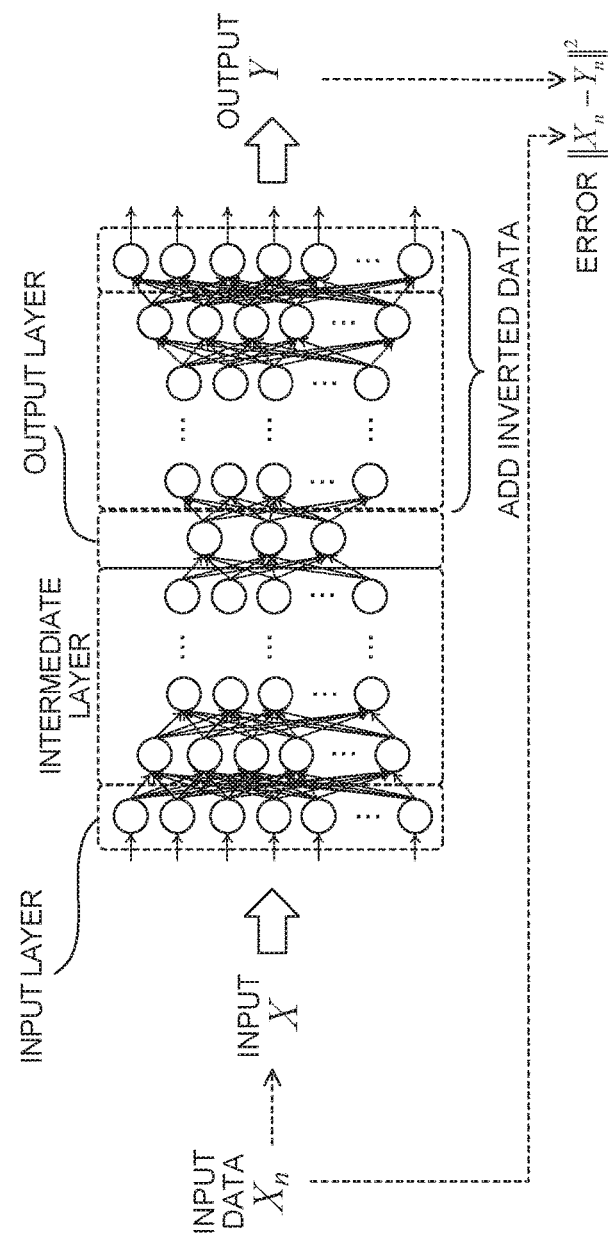
FIG. 7 is a schematic diagram showing an autoencoder.

The neural network may have three or more layers (called deep learning), as shown in FIG. 6. A calculation unit that extracts the features of inputs on a step-by-step basis and performs the regression of a result can be configured by a conventional autoencoder as shown in FIG. 7 so that learning may be automatically performed using only supervised data.

Next, a description will be given of the respective configurations provided in the tool state estimation apparatus 100 of the embodiment. The tool state estimation apparatus 100 has a learning section 111, a state observation section 112, a label acquisition section 113, and a learning model storage section 114.

The learning section 111 performs supervised learning based on input data acquired by the state observation section 112 and teacher data (also called a label) acquired by the label acquisition section 113 to construct a learning model and stores the constructed learning model in the learning model storage section 114. A learning model constructed by the learning section 111 is configured as a model for discriminating between "dynamic information on the vicinity of a tool in a case in which a state of the tool is fine" and "dynamic information on the vicinity of a tool in a case which a state of the tool is deteriorated" described above with reference to FIG. 3.

The state observation section 112 generates input data from log data stored in the log data storage section 200 and outputs the generated input data to the learning section 111. In the tool state estimation apparatus 100 of the embodiment, input data is dynamic information on the vicinity of a tool for each unit time acquired from a machine tool. For dynamic information on the vicinity of a tool expressed by numeric values, the state observation section 112 directly uses the numeric values as input data of the learning section 111. For dynamic information on the vicinity of a tool expressed by information other than numeric values such as character strings, the state observation section 112 may store a conversion table, with which respective character strings are converted into numeric values, on a memory (not shown) in advance and digitize the information other than the numeric values using the conversion table to be contained in input data.

Figure 8:
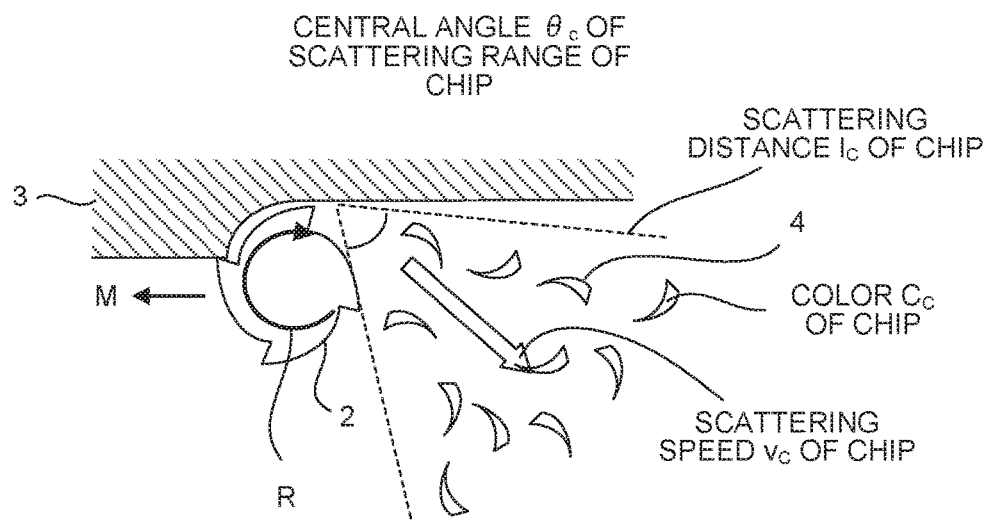
FIG. 8 is a diagram for describing input data used in machine learning according to an embodiment of the present invention.

FIG. 8 is a diagram showing an example of input data used in machine learning in machining using an endmill tool 2.

In a case in which a scattering state of chip 4 around the tool 2 in the machining is used as input data, the state observation section 112 of the embodiment may perform known image analysis processing on image information included in dynamic information on the vicinity of the tool 2 acquired from the log data storage section 200 and acquire the scattering state of the chip 4 generated by the machining of the endmill tool 2 as input data as shown in FIG. 8. In this case, the state observation section 112 may analyze the changes between the respective frames of moving image information on the vicinity of the tool 2 picked up by an image pickup unit (not shown) to specify picked up chip 4 and a scattering status of the chip 4, and contain an average scattering distance of the chip 4 about a tool position as a scattering distance $l_c$ and an average scattering speed of the chip 4 as a scattering speed $v_c$ of the chip 4 in the input data. Further, the state observation section 112 may digitize a color of chip acquired from dynamic information in an RGB system or the like and set the digitized color as a chip color $c_c$. Further, the state observation section 112 may approximate a chip scattering range with a fan shape and set the central angle of the fan shape as a central angle $\theta_c$ of a chip scattering range.

Further, when sound generated between the tool 2 and the workpiece 3 during machining is used as input data, the state observation section 112 may analyze frequency components of sound information acquired from the log data storage section 200 and use information (such as a frequency and a size) on some characteristic frequency components as the input data.

The label acquisition section 113 generates teacher data (fine/deteriorated tool state) corresponding to input data simultaneously with the generation of the input data by the state observation section 112 based on log data stored in the log data storage section 200, and then outputs the generated teacher data to the learning section 111. In a case in which a multilayer neural network shown in, for example, FIG. 6 is used as a learning model, teacher data may be so set that the respective signals of an output layer are made to correspond to a "fine tool state" and a "deteriorated tool state" and any of the signals corresponding to the teacher data becomes 1.

With the above configurations, the tool state estimation apparatus 100 of the embodiment may advance the machine learning of the relationship between dynamic information on the vicinity of a tool and a state of the tool during the operation of a machine tool and construct a learning model.

Next, a description will be given of an embodiment of the tool state estimation apparatus 100 that estimates a state of a tool using a learning model constructed by supervised learning.

Figure 9:
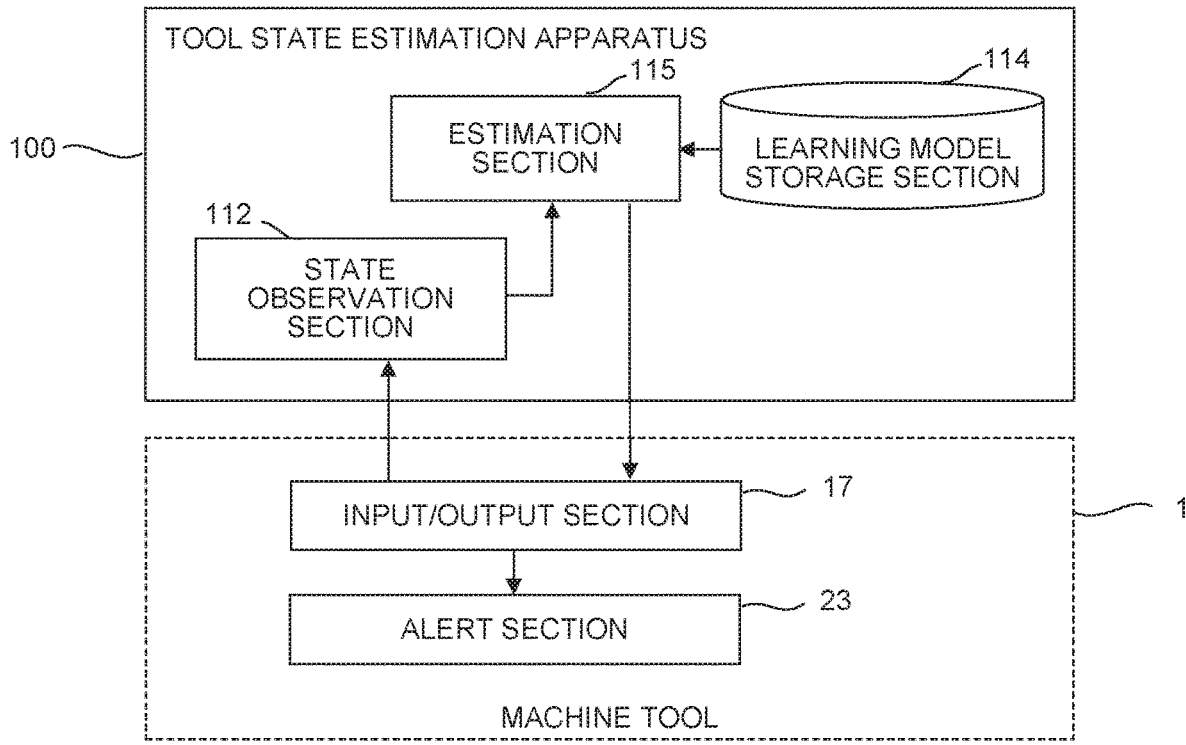
FIG. 9 is a schematic function block diagram of the tool state estimation apparatus in the estimation of a state of a tool according to an embodiment of the present invention.

FIG. 9 is a schematic function block diagram of the tool state estimation apparatus 100 in the estimation of a state of a tool according to an embodiment of the present invention.

Based on information acquired by an image pickup unit provided in the machine tool 1 or the like and input via an input/output section 17 provided in a machine tool 1 acting as an environment, the tool state estimation apparatus 100 of the embodiment estimates a state of a tool 2 used by the machine tool 1 to perform machining. The input/output section 17 outputs image information picked up by the image pickup unit provided in the machine tool 1, sound information picked up by a sound pickup unit (not shown), and information such as signals from respective sections to the tool state estimation apparatus 100. Note that although FIG. 9 shows only the input/output section 17 and an alert section 23 as function blocks provided in the machine tool 1, the machine tool 1 actually has respective function blocks provided in conventional machine tools.

The tool state estimation apparatus 100 in FIG. 9 has the state observation section 112, the learning model storage section 114, and an estimation section 115.

The state observation section 112 acquires dynamic information on the vicinity of a tool used as input data in the learning described above via the input/output section 17 during the operation of the machine tool 1, generates input data based on the acquired information, and outputs the generated input data to the estimation section 115.

The estimation section 115 estimates a state of a tool based on input data (dynamic information on the vicinity of the tool) input from the state observation section 112 using a learning model stored in the learning model storage section 114, and outputs a result of the estimation to the input/output section 17. Then, when the result of the estimation of the state of the tool input from the estimation section 115 indicates that the state of the tool has been deteriorated, the input/output section 17 instructs the alert section 23 to issue an alert.

When instructed by the input/output section 17 to issue an alert, the alert section 23 notifies an operator of the fact that a state of a tool has been deteriorated via a lamp arranged in the machine operation panel (not shown) of the machine tool 1, the display of a display unit, sound, or the like. When input data is discriminated at a prescribed time before and after a time at which a tool is to be replaced to perform machine learning as described above with reference to, for example, FIG. 3, the alert section 23 may display a specific time like, for example, "please replace a tool in  hours" on the display unit. Further, besides issuing an alert, the alert section 23 may instruct the respective sections of the machine tool 1** to stop their operations.

Next, a description will be given, with reference to FIGS. 10 to 14, of an embodiment of the tool state estimation apparatus of the present invention in a case in which unsupervised learning is used as a learning method. In many points, the tool state estimation apparatus 100 of the embodiment is similar to the embodiment using supervised learning described above with reference to FIGS. 2 to 9. Hereinafter, points different from those of the embodiment described above with reference to FIGS. 2 to 9 will be described.

Figure 10:
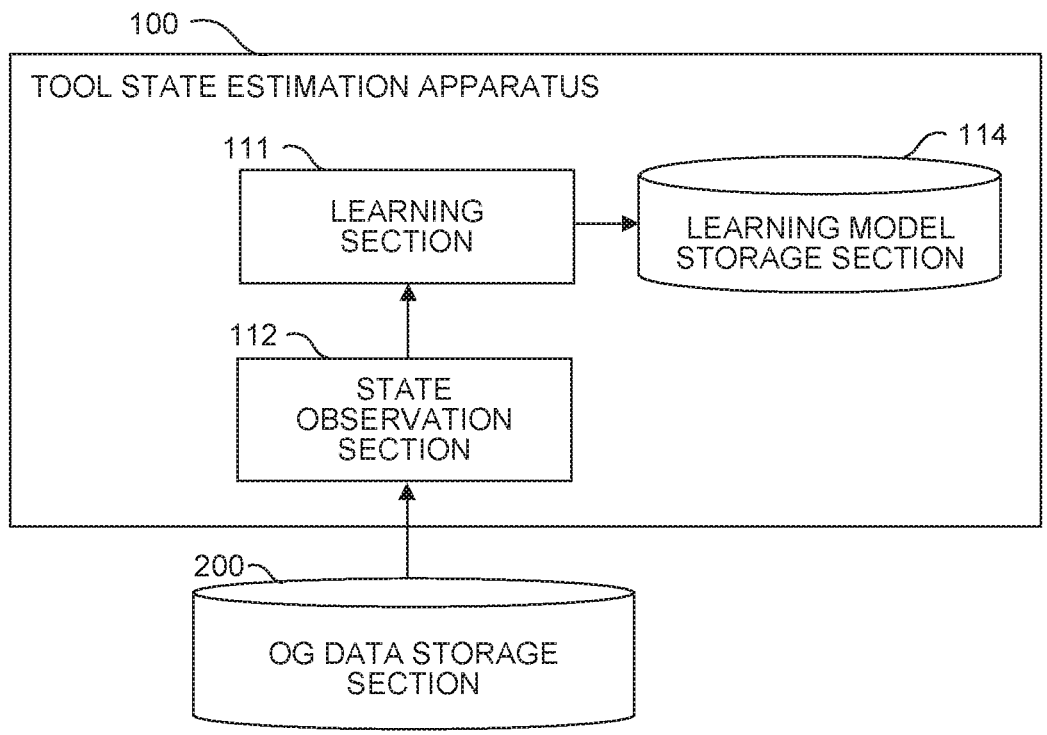
FIG. 10 is a schematic function block diagram of the tool state estimation apparatus in machine learning according to another embodiment of the present invention.

FIG. 10 is a schematic function block diagram of the tool state estimation apparatus in machine learning according to an embodiment of the present invention.

The learning section 111 provided in the tool state estimation apparatus 100 in machine learning according to an embodiment of the present invention performs unsupervised learning with dynamic information on the vicinity of a tool acquired by the state observation section 112 from the log data storage section 200 as input data to generate a cluster where a state of the tool is fine as a learning result, and then stores the learning result in the learning model storage section 114. In "unsupervised learning", it is possible to learn how input data is distributed by giving only a large amount of the input data to a learning device and subject the input data to compression, classification, formatting, or the like even if corresponding teacher output data is not given.

The tool state estimation apparatus 100 of the embodiment may use, for example, a principal component analysis (PCA), a support vector machine (SVM), a neural network, or the like as an unsupervised learning algorithm, and may use the method of deep learning with a plurality of intermediate layers set in a neural network as shown in FIG. 6.

Figure 11:
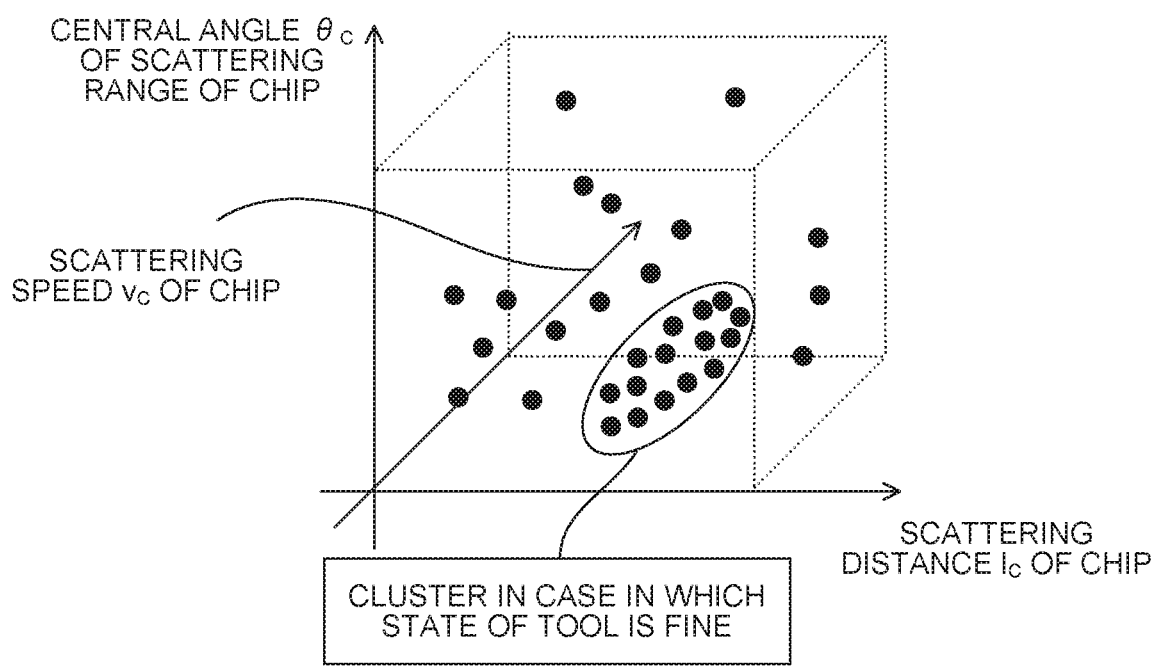
FIG. 11 is a diagram showing an example of a cluster generated by machine learning according to another embodiment of the present invention.

FIG. 11 is a diagram showing an example of the cluster of dynamic information on the vicinity of a tool in a case in which a state of the tool is fine. Note that FIG. 11 shows only the three information of a chip scattering distance $l_c$, a chip scattering speed $v_c$, and a central angle $\theta_c$ of a chip scattering range among dynamic information on the vicinity of a tool handled as input data to simplify a description. However, the dynamic information on the vicinity of a tool may be expressed as more multi-dimensional information.

Next, a description will be given of respective configurations provided in the tool state estimation apparatus 100.

The tool state estimation apparatus 100 has the learning section 111, the state observation section 112, and the learning model storage section 114.

Figure 12:
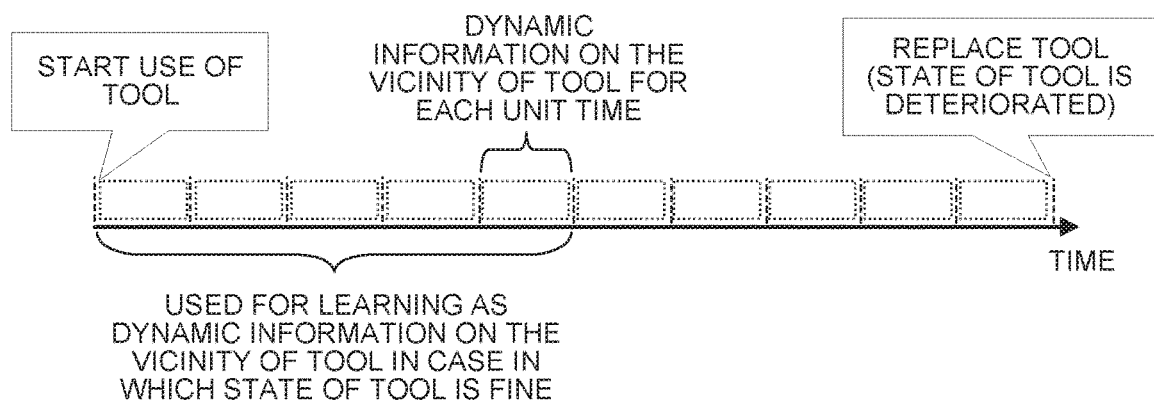
FIG. 12 is a diagram for describing dynamic information on the vicinity of a tool used in machine learning according to another embodiment of the present invention.

The learning section 111 performs unsupervised learning based on input data acquired by the state observation section 112 to construct a learning model and stores the constructed learning model in the learning model storage section 114. A learning model constructed by the learning section 111 of the embodiment is constructed using dynamic information on the vicinity of a tool at a time at which a state of the tool is fine within a prescribed time since the start of using the tool as shown in FIG. 12. The algorithm of a learning model constructed by the learning section 111 may be any type so long as the classification between dynamic information on the vicinity of a tool at a time at which a state of the tool is fine and the other information is allowed as described above.

The state observation section 112 generates input data from log data stored in the log data storage section 200 and outputs the generated input data to the learning section 111.

With the above configurations, the tool state estimation apparatus 100 may advance learning about dynamic information on the vicinity of a tool at a time at which a state of the tool is fine during the operation of a machine tool and construct a learning model.

Next, a description will be given of the tool state estimation apparatus 100 that estimates a state of a tool using a constructed learning model.

Figure 13:
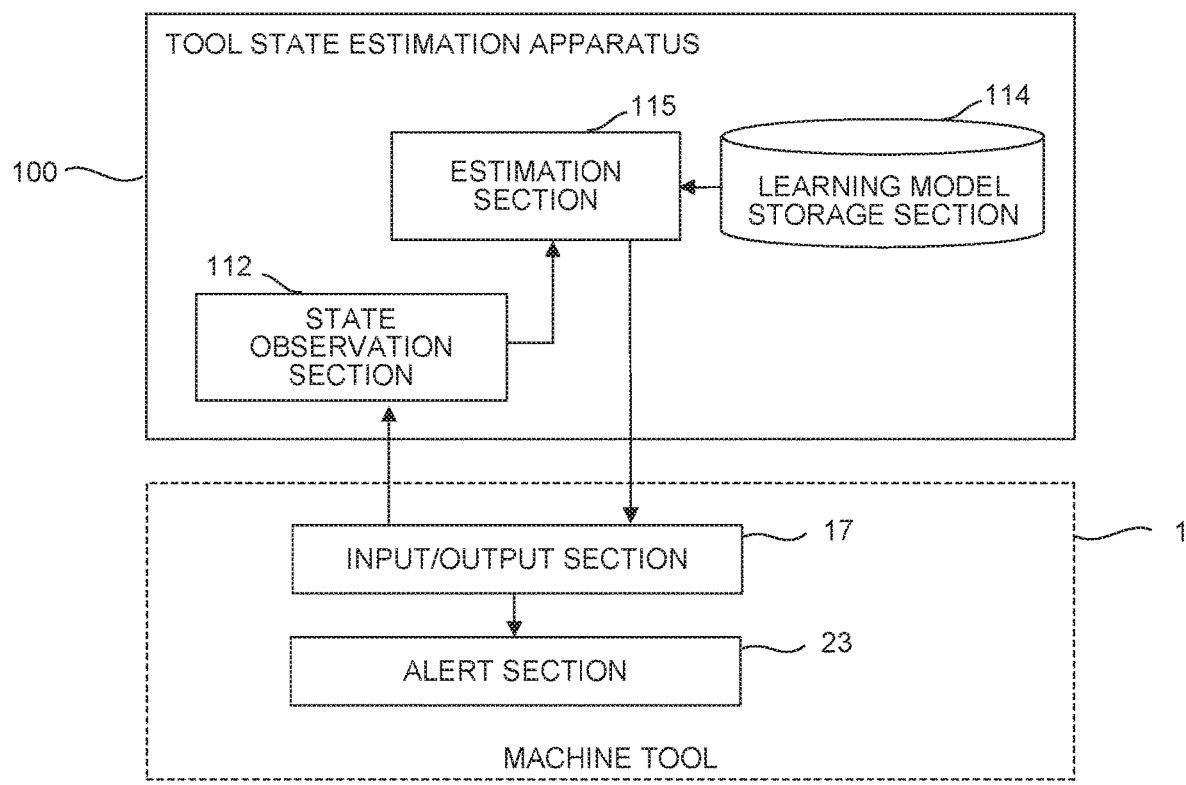
FIG. 13 is a schematic function block diagram of the tool state estimation apparatus in the estimation of a state of a tool according to another embodiment of the present invention.

FIG. 13 is a schematic function block diagram of the tool state estimation apparatus 100 in the estimation of a state of a tool according to an embodiment of the present invention. The tool state estimation apparatus 100 of the embodiment estimates a state of a tool used in the machine tool 1 based on dynamic information on the vicinity of the tool from the machine tool 1 acting as an environment.

Figure 14:
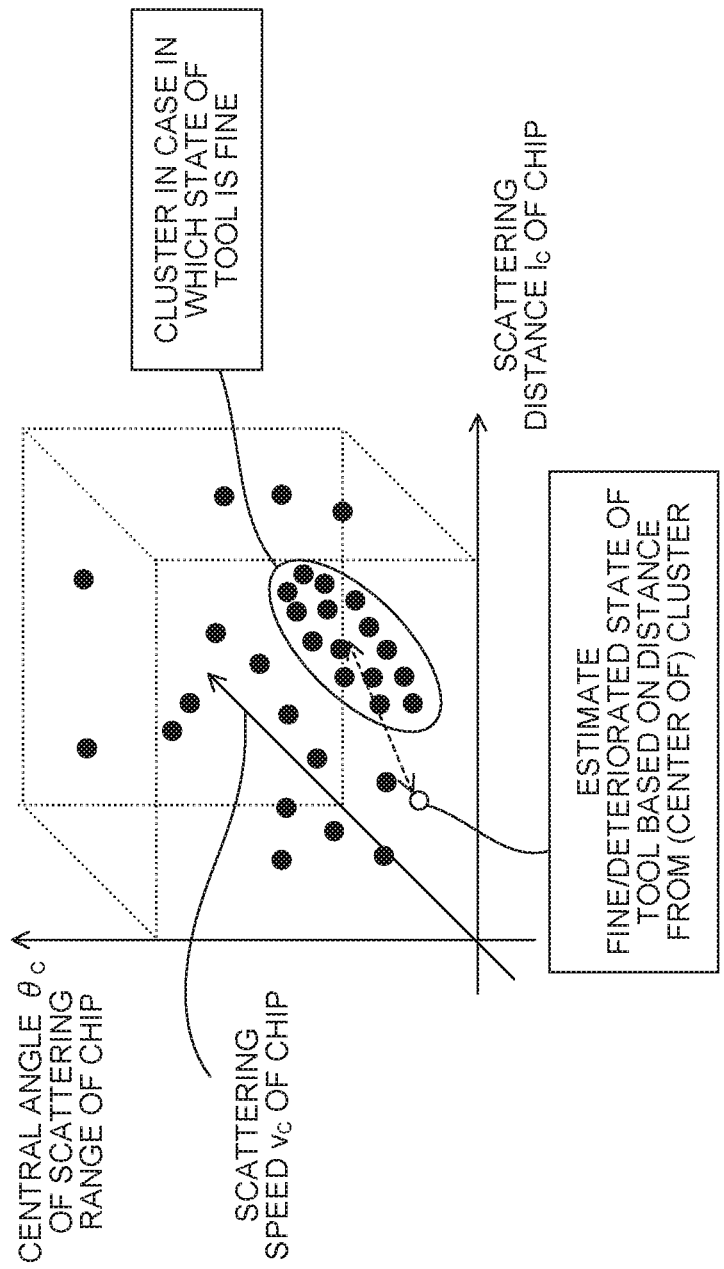
FIG. 14 is a diagram for describing a method for estimating a state of a tool according to another embodiment of the present invention.

The estimation section 115 provided in the tool state estimation apparatus 100 of the embodiment determines the distance between input data (dynamic information on the vicinity of a tool) input from the state observation section 112 and a cluster at a time at which a state of the tool is fine using a learning model stored in the learning model storage section 114 to estimate the state of the tool. As shown in FIG. 14, it is estimated by the estimation section 115 that a state of a tool is fine when the distance between input data and (the center of) a cluster of dynamic information on the vicinity of the tool at a time at which the state of the tool is fine is a prescribed threshold or less, and that the state of the tool is deteriorated when the distance is longer than the threshold.

Thus, the estimation section 115 outputs an estimation result of a state of a tool using input data generated based on dynamic information on the vicinity of the tool acquired from the machine tool 1 to the input/output section 17 of the machine tool 1. The input/output section 17 instructs the alert section 23 to issue an alert when an estimation result of a state of a tool input from the estimation section 115 indicates that the state of the tool is deteriorated.

As described above, using a learning model acquired by machine learning based on dynamic information on the vicinity of a tool in one or more machine tools 1, the tool state estimation apparatus 100 is allowed to estimate a state of the tool during the operation of the machine tools 1. Further, when it is estimated by the tool state estimation apparatus 100 that a state of a tool is deteriorated, the operator of the machine tool 1 is allowed to stop the operation of the machine tool according to the plan and replace the tool based on a result of the estimation.

The embodiments of the present invention are described above. The present invention is not limited only to the examples of the above embodiments but may be carried out in various aspects by making an appropriate change.

The above embodiments describe learning and using modes in one tool state estimation apparatus 100, but a learning model itself constructed by the learning section 111 and stored in the learning model storage section 114 is a data set indicating a learning result. Therefore, for example, a learning model may be shared with other tool state estimation apparatuses 100 via an external storage device, a network, or the like (not shown). With this configuration, each of tool state estimation apparatuses 100 may perform learning in parallel and reduce a time for completing the learning in a state in which one learning model is shared between the plurality of tool state estimation apparatuses 100. On the other hand, in the use of a learning model, each of a plurality of tool state estimation apparatuses 100 may estimate a state of a tool using a shared learning model. A method for sharing a learning model is not limited to a particular method. For example, a learning model may be stored in advance in a host computer at a factory and shared between respective tool state estimation apparatuses 100, or a learning model may be stored in advance on a server installed by a manufacturer and shared between tool state estimation apparatuses 100 of clients.

Further, the above embodiments separately describe the configurations of the tool state estimation apparatus 100 in learning and estimation, but the tool state estimation apparatus 100 may have both configurations in learning and configurations in estimation. In this case, the learning section 111 may perform additional learning based on information input by a manager or a maintenance staff at the machine tool 1 in a state in which the tool state estimation apparatus 100 estimates a state of a tool.

Further, the above embodiments describe an example of input data in machining by an endmill tool but may also be applied to other tool types such as a tapping tool and a milling tool. In machining with any tool, dynamic information on the vicinity of the tool in machining changes with a state of the tool. Therefore, by constructing a learning model through the machine learning of the dynamic information with the learning section 111, it is possible to provide the tool state estimation apparatus 100 capable of dealing with various machining.

Further, the above embodiments describe image information and sound information indicating dynamic information on the vicinity of a tool as an example of input data, but only image information or sound information may be used as input data. Further, besides dynamic information on the vicinity of a tool, for instance, information on a workpiece material and information on a tool type may be added to input data to perform machine learning capable of dealing with information in a wider range.

Figure 15:
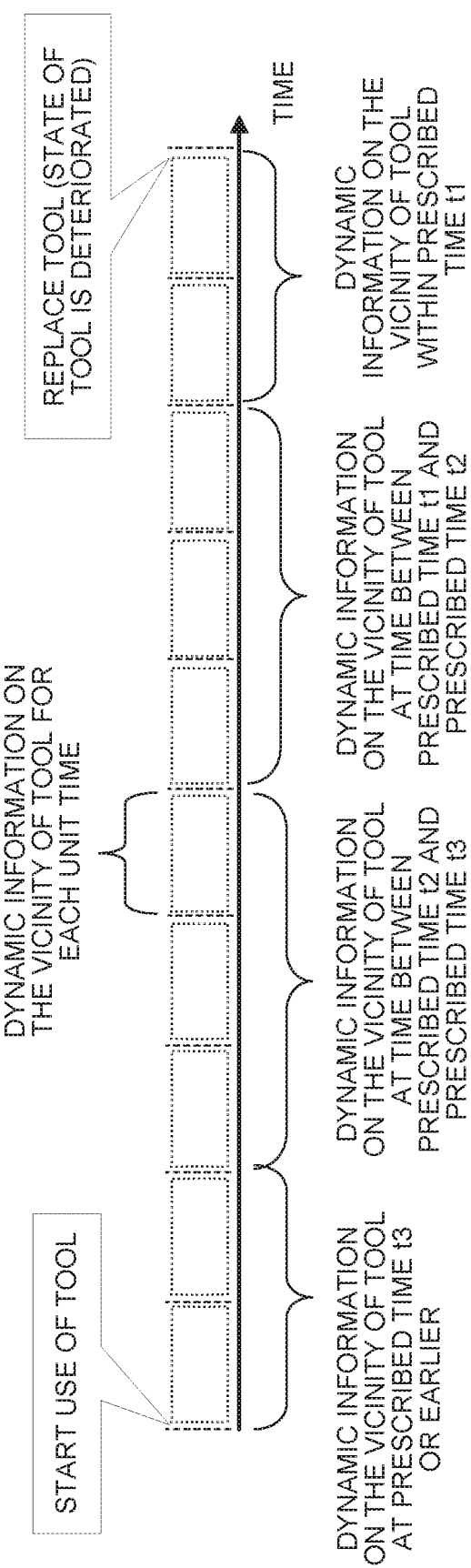
FIG. 15 is a diagram for describing an applied example of the machine learning of the present invention.

Moreover, the above embodiments separately perform machine learning for each of dynamic information on the vicinity of a tool at a time at which a state of the tool is fine and dynamic information on the vicinity of the tool at a time at which the state of the tool is deteriorated. However, as shown in FIG. 15, by separately performing machine learning for each of dynamic information on the vicinity of a tool at a time between a prescribed time t1 and a prescribed time t2 before a state of the tool is deteriorated, dynamic information on the vicinity of the tool at a time between the prescribed time t2 and a prescribed time t3 before the state of the tool is deteriorated, and dynamic information on the vicinity of the tool at the prescribed time t3 or earlier before the state of the tool is deteriorated, it becomes possible to more finely estimate when the state of the tool is deteriorated.

The invention claimed is:

1. A tool state estimation apparatus for estimating a state of a tool used by a machine tool to machine a workpiece, the tool state estimation apparatus comprising:
a processor configured to:
acquire dynamic information on the vicinity of the tool from log data acquired during an operation of the machine tool,
generate input data based on the acquired dynamic information on the vicinity of the tool, the dynamic information including dynamic information that includes at least scattering state of chips in the machining of the workpiece, and
perform machine learning, using the generated input data, to construct a learning model; and
a storage configured to store the constructed learning model.

2. The tool state estimation apparatus according to claim 1, wherein
the machine learning is supervised learning, and
the processor is further configured to
acquire, from the log data acquired during the operation of the machine tool, teacher data indicating the state of the tool corresponding to the generated input data, and
perform the supervised learning, using the generated input data and the acquired teacher data, to construct the learning model.

3. The tool state estimation apparatus according to claim 1, wherein
the machine learning is unsupervised learning, and
the processor is configured to perform the unsupervised learning, using the generated input data, to construct the learning model in which a cluster based on the dynamic information on the vicinity of the tool is generated.

4. The tool state estimation apparatus according to claim 1, wherein
the dynamic information on the vicinity of the tool is information on an image indicating a scattering state of chips generated by machining of the machine tool.

5. The tool state estimation apparatus according to claim 4, wherein the image is acquired during the operation of the machine tool.

6. The tool state estimation apparatus according to claim 1, wherein
the processor is further configured to
acquire static information on the machining from the log data acquired during the operation of the machine tool, and
generate the input data based on the acquired static information as well as the dynamic information on the vicinity of the tool.

7. The tool state estimation apparatus according to claim 1, wherein
the scattering state includes at least one of (1) central angle of scattering range of the chips, (2) scattering distance of the chips, or (3) scattering speed of the chips.

8. A tool state estimation apparatus for estimating a service life of a tool used by a machine tool to machine a workpiece, the tool state estimation apparatus comprising:
a storage configured to store a learning model constructed by machine learning based on dynamic information on the vicinity of the tool acquired during an operation of the machine tool, the dynamic information including dynamic information that includes at least scattering state of chips in the machining of the workpiece; and
a processor configured to:
acquire dynamic information on the vicinity of the tool from log data acquired during the operation of the machine tool,
generate input data based on the acquired dynamic information on the vicinity of the tool, the dynamic information including dynamic information that includes at least scattering state of chips in the machining of the workpiece, and
estimate, using the learning model, a state of the tool from the generated input data.

9. The tool state estimation apparatus according to claim 8, wherein
the learning model is constructed by the machine learning based on both (i) the dynamic information on the vicinity of the tool acquired during the operation of the machine tool and (ii) static information on the machining, and
the processor is further configured to
acquire static information on the machining from the log data acquired during the operation of the machine tool, and
generate the input data based on the acquired static information as well as the dynamic information on the vicinity of the tool.

10. A machine tool, comprising:
an input/output section communicating with a tool state estimation apparatus which is configured to estimate a service life of a tool used by the machine tool to machine a workpiece, the tool state estimation apparatus comprising:
a storage configured to store a learning model constructed by machine learning based on dynamic information on the vicinity of the tool acquired during an operation of the machine tool, the dynamic information including dynamic information that includes at least scattering state of chips in the machining of the workpiece; and
a processor configured to:
acquire dynamic information on the vicinity of the tool from log data acquired during the operation of the machine tool,
generate input data based on the acquired dynamic information on the vicinity of the tool, the dynamic information including dynamic information that includes at least scattering state of chips in the machining of the workpiece, and
estimate, using the learning model, a state of the tool from the generated input data; and
an alert section configured to issue an alert based on an estimation result of the state of the tool by the processor of the tool state estimation apparatus.

* * * * *